(12) United States Patent
McLaughlin et al.

(10) Patent No.: US 12,084,396 B2
(45) Date of Patent: *Sep. 10, 2024

(54) SWELLABLE FERTILIZER GRANULES CONTAINING ELEMENTAL SULFUR WITH INCREASED OXIDATION RATES

(71) Applicant: The Mosaic Company, Plymouth, MN (US)

(72) Inventors: Michael McLaughlin, Montacute (AU); Jozefien Degryse, Parkside (AU); Roslyn Baird, Aberfoyle Park (AU); Rodrigo Coqui da Silva, Redwood Park (AU)

(73) Assignee: The Mosaic Company, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,828

(22) Filed: Jun. 17, 2022

(65) Prior Publication Data

US 2022/0324773 A1   Oct. 13, 2022

Related U.S. Application Data

(63) Continuation of application No. 16/842,024, filed on Apr. 7, 2020, now Pat. No. 11,384,034, which is a
(Continued)

(51) Int. Cl.
C05D 9/00 (2006.01)
C05B 1/00 (2006.01)
(Continued)

(52) U.S. Cl.
CPC ............... *C05G 5/30* (2020.02); *C05B 1/00* (2013.01); *C05B 7/00* (2013.01); *C05B 19/00* (2013.01);
(Continued)

(58) Field of Classification Search
None
See application file for complete search history.

(56) References Cited

U.S. PATENT DOCUMENTS 3,177,062 A   4/1965   Hignett et al.
3,903,333 A   9/1975   Shirley, Jr. et al.
(Continued)

FOREIGN PATENT DOCUMENTS

CN   101402532 A   4/2009
CN   102395543 A   3/2012
(Continued)

OTHER PUBLICATIONS

Application and File history for U.S. Appl. No. 15/910,806, filed Mar. 2, 2018, 246 pages, Inventors: McLaughlin et al.
(Continued)

*Primary Examiner* — Wayne A Langel
(74) *Attorney, Agent, or Firm* — Husch Blackwell LLP

(57) ABSTRACT

Fertilizer granules containing elemental sulfur and a hydrogel which expands or swells in the soil to more readily disperse the elemental sulfur surface throughout the soil, which increases the elemental sulfur surface area available for oxidation, and ultimately uptake of sulfur by the plant. The elemental sulfur and hydrogel can be added to a fertilizer composition as either an exterior coating or co-granulated with the base fertilizer composition.

11 Claims, 7 Drawing Sheets

Related U.S. Application Data continuation of application No. 15/910,806, filed on Mar. 2, 2018, now Pat. No. 10,611,701.

(60) Provisional application No. 62/510,080, filed on May 23, 2017.

(51) Int. Cl.

| | | |
|---|---|---|
| *C05B 7/00* | (2006.01) | |
| *C05B 19/00* | (2006.01) | |
| *C05D 9/02* | (2006.01) | |
| *C05G 3/40* | (2020.01) | |
| *C05G 5/30* | (2020.01) | |

(52) U.S. Cl.
CPC ............... *C05D 9/00* (2013.01); *C05D 9/02* (2013.01); *C05G 3/40* (2020.02)

(56) References Cited

U.S. PATENT DOCUMENTS

| | | | |
|---|---|---|---|
| 4,015,972 | A | 4/1977 | Watkins et al. |
| 4,032,319 | A | 6/1977 | Smith et al. |
| 4,081,264 | A | 3/1978 | Ali |
| 4,133,669 | A | 1/1979 | Caldwell et al. |
| 4,330,319 | A | 5/1982 | Bexton et al. |
| 4,334,906 | A | 6/1982 | Young |
| 4,402,725 | A | 9/1983 | Heller et al. |
| 4,547,213 | A | 10/1985 | Stoller |
| 4,857,098 | A | 8/1989 | Shirley, Jr. |
| 4,881,963 | A | 11/1989 | Fujita et al. |
| 5,112,379 | A | 5/1992 | Young |
| 5,152,821 | A | 10/1992 | Walter |
| 5,158,594 | A | 10/1992 | Oxford |
| 5,176,734 | A | 1/1993 | Fujita et al. |
| 5,405,426 | A | 4/1995 | Timmons et al. |
| 5,460,765 | A | 10/1995 | Derdall et al. |
| 5,466,274 | A | 11/1995 | Hudson et al. |
| 5,571,303 | A | 11/1996 | Bexton |
| 5,599,373 | A | 2/1997 | Zanuccoli |
| 5,599,374 | A | 2/1997 | Detrick |
| 5,984,994 | A | 11/1999 | Hudson |
| 6,013,209 | A | 1/2000 | Phinney |
| 6,461,399 | B1 | 10/2002 | Connell |
| 6,544,313 | B2 | 4/2003 | Peacock et al. |
| 6,749,659 | B1 | 6/2004 | Yu et al. |
| 8,814,976 | B2 | 8/2014 | Pedersen |
| 9,162,932 | B2 | 10/2015 | Peacock et al. |
| 9,409,827 | B2 | 8/2016 | Taylor et al. |
| 10,611,701 | B2 | 4/2020 | McLaughlin et al. |
| 11,384,034 | B2 * | 7/2022 | McLaughlin ............. C05B 1/00 |
| 2003/0164015 | A1 | 9/2003 | Pildysh |
| 2004/0050127 | A1 | 3/2004 | Ambri |
| 2009/0308122 | A1 | 12/2009 | Shah |
| 2012/0036906 | A1 | 2/2012 | Pedersen |
| 2012/0285211 | A1 | 11/2012 | Kucera et al. |
| 2013/0031943 | A1 | 2/2013 | Ferguson et al. |
| 2013/0143737 | A1 | 6/2013 | Varadachari |
| 2014/0109639 | A1 | 4/2014 | Taylor et al. |
| 2014/0150136 | A1 | 5/2014 | Ravishankar |
| 2014/0216120 | A1 | 8/2014 | Taylor et al. |
| 2015/0128671 | A1 | 5/2015 | Ishizaka |
| 2015/0135786 | A1 | 5/2015 | Weaver et al. |
| 2015/0319945 | A1 | 11/2015 | Ishizaka |
| 2016/0083308 | A1 | 3/2016 | Peacock et al. |
| 2016/0102028 | A1 | 4/2016 | Lee et al. |
| 2016/0185679 | A1 | 6/2016 | Ghalili et al. |
| 2016/0229761 | A1 | 8/2016 | Cherry et al. |
| 2017/0044078 | A1 | 2/2017 | McLaughlin et al. |
| 2018/0162781 | A1 | 6/2018 | Iyer et al. |
| 2018/0237351 | A1 | 8/2018 | Cotrim et al. |
| 2019/0039965 | A1 | 2/2019 | Iyer et al. |

FOREIGN PATENT DOCUMENTS

| | | |
|---|---|---|
| CN | 102731199 A | 10/2012 |
| EA | 021511 B1 | 7/2015 |
| GR | 1008989 B | 3/2017 |
| KR | 10-2017-0054380 | 5/2017 |
| RU | 2206194 C2 | 6/2003 |
| WO | WO-2009051496 A1 | 4/2009 |
| WO | WO-2015114651 A2 | 8/2015 |
| WO | 2016183685 | 11/2016 |

OTHER PUBLICATIONS

Search Report and Written Opinion mailed for PCT Application No. PCT/US2018/034125, mailed on Sep. 12, 2018, 14 pages.

* cited by examiner

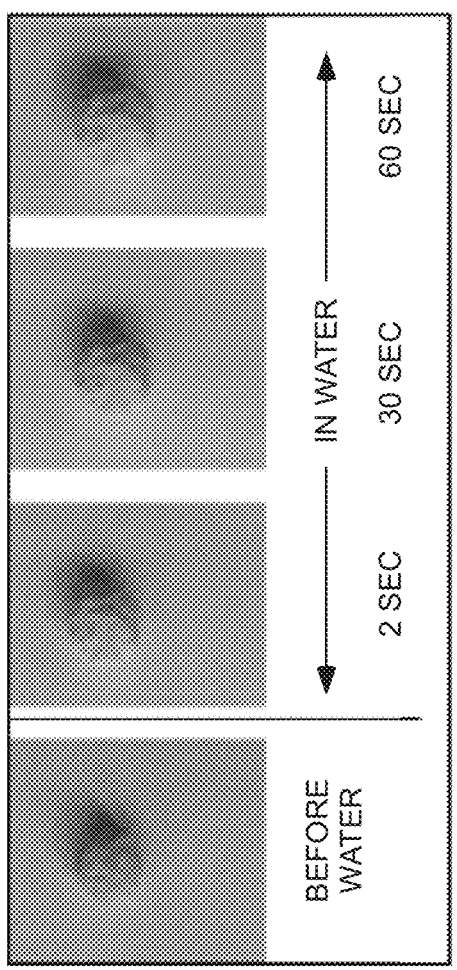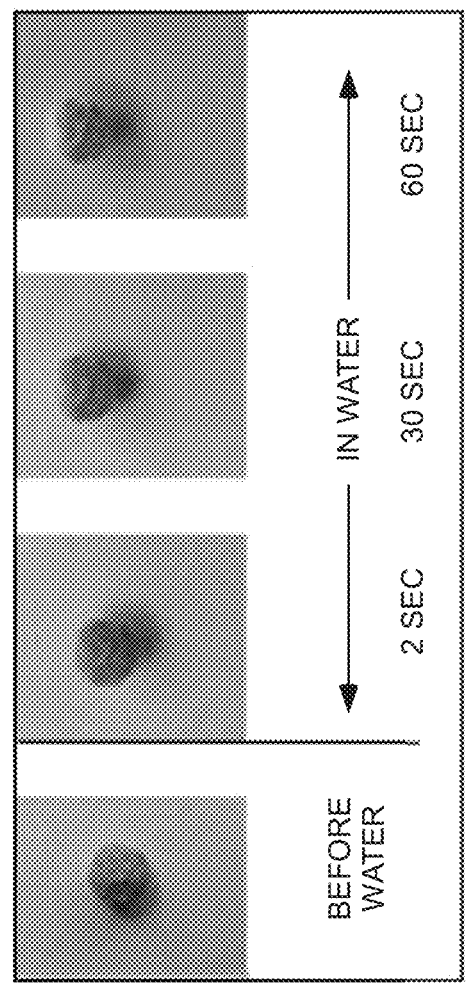

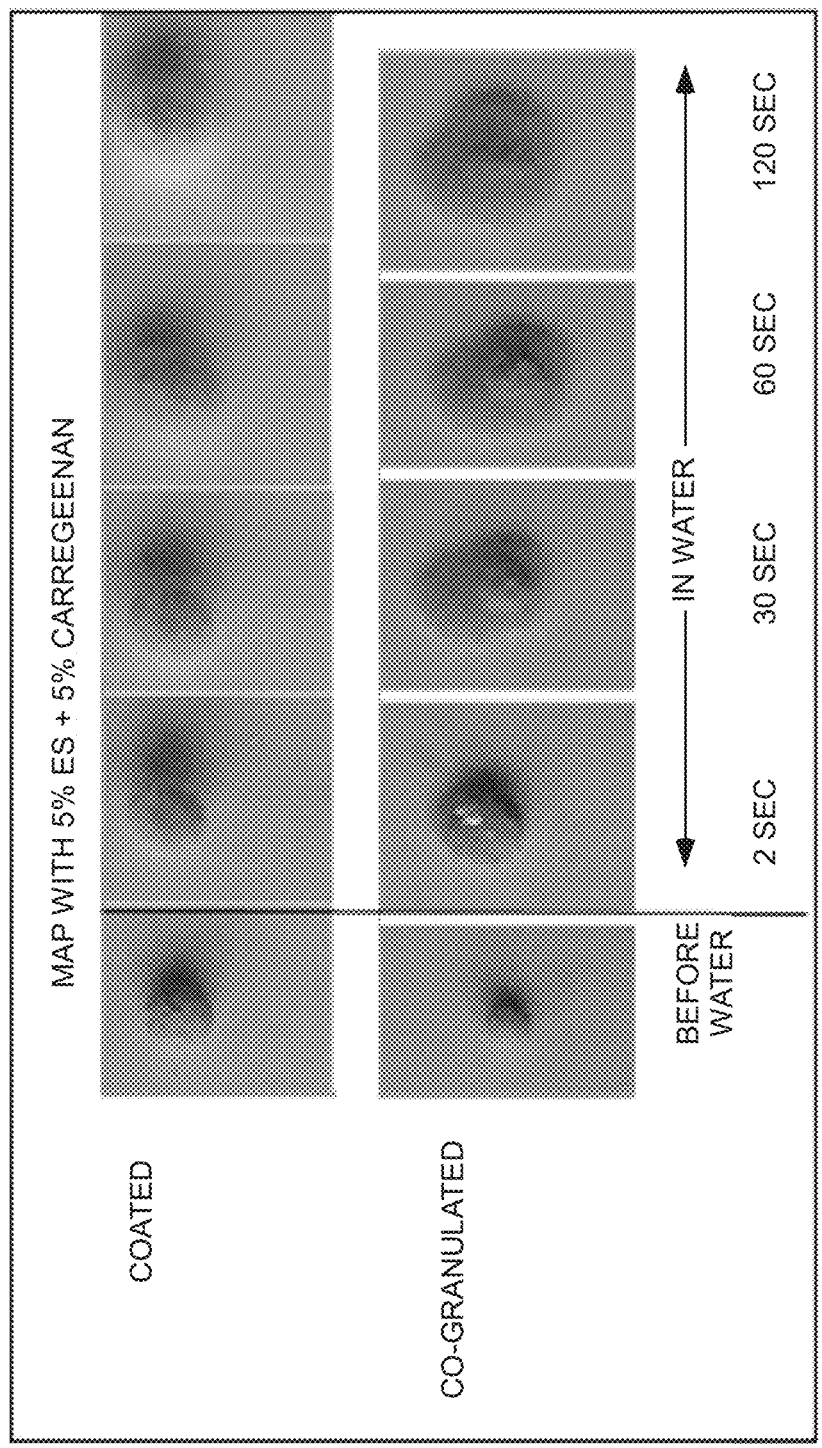

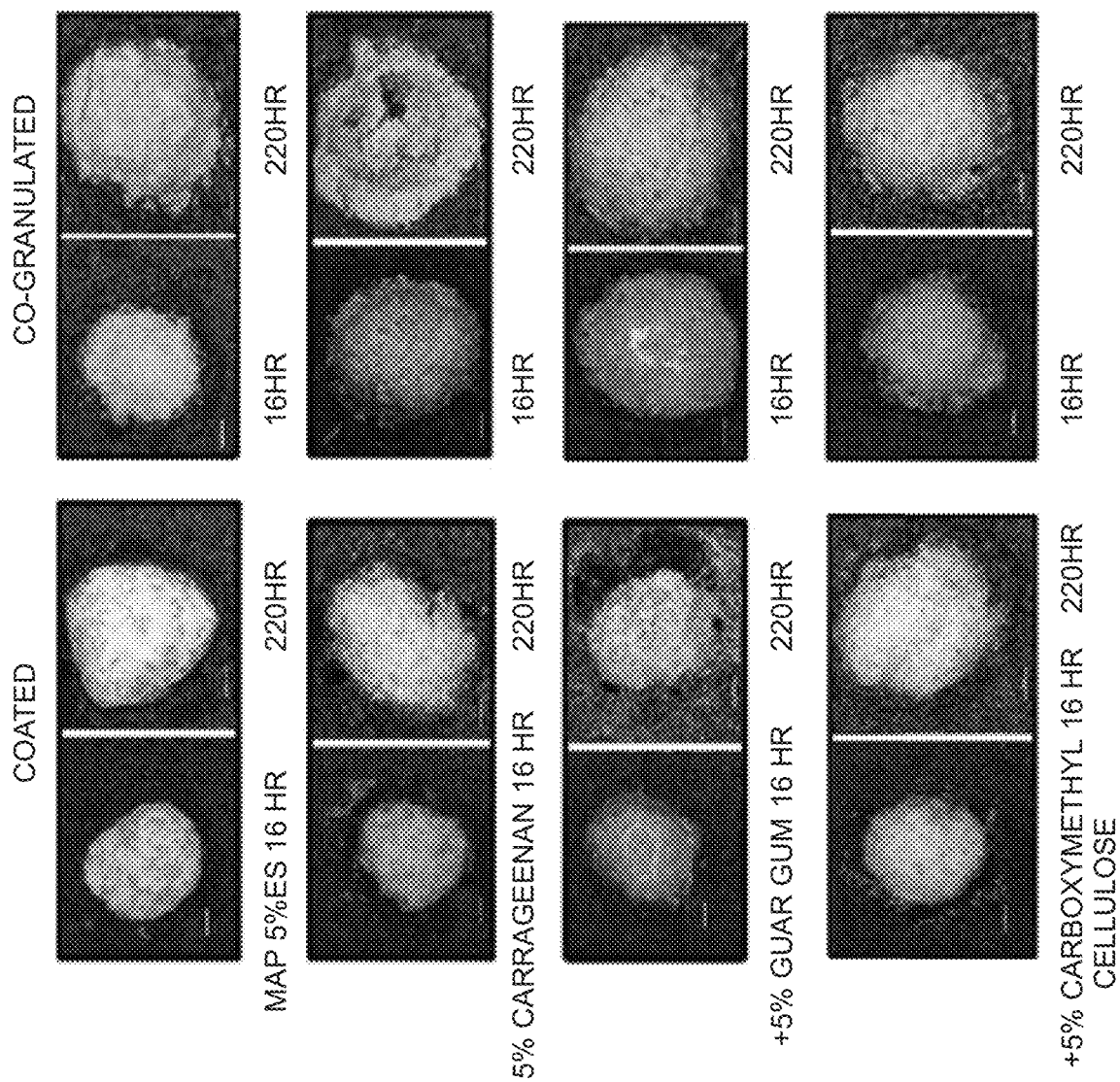

SWELLABLE FERTILIZER GRANULES CONTAINING ELEMENTAL SULFUR WITH INCREASED OXIDATION RATES

RELATED APPLICATIONS

This application is a continuation of application Ser. No. 16/842,024 filed Apr. 7, 2020, which is a continuation of application Ser. No. 15/910,806 filed Mar. 2, 2018, now U.S. Pat. No. 10,611,701, issued Apr. 7, 2020, which claims the benefit of U.S. Provisional Application No. 62/510,080 filed May 23, 2017, each of which is hereby incorporated herein in its entirety by reference.

FIELD OF THE INVENTION

The invention relates generally to fertilizer compositions. More specifically, the invention relates to incorporation of elemental sulfur and a swellable material, such as a hydrogel, for increased dispersion of the elemental sulfur to enhance oxidation in soil.

BACKGROUND

Essential plant nutrients include primary nutrients, secondary or macronutrients and trace or micronutrients. Primary nutrients include carbon, hydrogen, oxygen, nitrogen, phosphorus, and potassium. Carbon and oxygen are absorbed from the air, while other nutrients including water (source of hydrogen), nitrogen, phosphorus, and potassium are obtained from the soil. Fertilizers containing sources of nitrogen, phosphorus, and/or potassium are used to supplement soils that are lacking in these nutrients.

According to the conventional fertilizer standards, the chemical makeup or analysis of fertilizers is expressed in percentages (by weight) of the essential primary nutrients nitrogen, phosphorous, and potassium. More specifically, when expressing the fertilizer formula, the first value represents the percent of nitrogen expressed on the elemental basis as "total nitrogen" (N), the second value represents the percent of phosphorous expressed on the oxide basis as "available phosphoric acid" ($P_2O_5$), and the third value represents the percent of potassium also expressed on the oxide basis as "available potassium oxide" ($K_2O$), or otherwise known as the expression (N—$P_2O_5$—$K_2O$).

Even though the phosphorous and potassium amounts are expressed in their oxide forms, there technically is no $P_2O_5$ or $K_2O$ in fertilizers. Phosphorus exists most commonly as monocalcium phosphate, but also occurs as other calcium or ammonium phosphates. Potassium is ordinarily in the form of potassium chloride or sulfate. Conversions from the oxide forms of P and K to the elemental expression (N—P—K) can be made using the following formulas:

$$\% P = \% P_2O_5 \times 0.437\% \quad K = \% K_2O \times 0.826\%$$

$$P_2O_5 = \% P \times 2.29\% \quad K_2O = \% K \times 1.21$$

In addition to the primary nutrients that are made available to plants via fertilizer added to soil, micronutrients and secondary nutrients are also essential for plant growth. Secondary nutrients include sulfur (S), calcium (Ca) and magnesium (Mg). Micronutrients are required in much smaller amounts than primary or secondary nutrients, and include boron (B), zinc (Zn), manganese (Mn), nickel (Ni), molybdenum (Mo), copper (Cu), iron (Fe) and chlorine (Cl).

The secondary nutrient sulfur is an essential element for plant growth and where deficiency occurs plants show yellowing leaves and stunted growth resulting in crop yield losses. The most cost-effective way to introduce sulfur to soil is to use elemental sulfur, as it is 100% S and therefore has low transport and handling costs. When sulfur is applied to soil in its elemental form ($S^0$), it needs to first be oxidized to its sulfate form by soil microorganisms to enable uptake by the plant. Research has shown that smaller particles oxidize faster when elemental sulfur particles are dispersed through soil, because of their high particle surface area.

To provide the sulfur in a form suitable for application to soil, small sulfur particles cannot be bulk blended with granular fertilizers such as phosphates, nitrates, ureas, and/or potashes to form a physical blend, unless they are incorporated into a pastille or granule with a similar particle size to the rest of the blend. This is because fine elemental sulfur itself presents an explosion/fire hazard when airborne, especially in confined spaces such as spreading equipment, augers, bucket elevators or where there are any potential ignition sources. One other problem with blends containing elemental sulfur particles is that they can undergo size segregation during handling and transportation as the particles settle, resulting in smaller particles (i.e. sulfur) concentrating near the bottom of the bulk blend. Consequently, sulfur is not uniformly distributed throughout the blend, resulting in uneven sulfur dosage when the blend is applied to soil. For example, some treated areas may receive too much sulfur, whereas others may receive too little sulfur.

Sulfur has also been incorporated in fertilizer compositions as a coating, but for a different purpose. Specifically, sulfur has been used in the manufacture of slow release fertilizer compositions as a relatively thick outer coating or shell firmly anchored to the surface of fertilizer particles. In such compositions, the objective is to provide slow release of the underlying fertilizer to the soil, and optionally, for the delivery of sulfur to the soil for subsequent oxidation and plant utilization.

One method for delivering elemental sulfur more uniformly to soil than bulk blending or coating, includes the incorporation of sulfur platelets embedded in the fertilizer portion of the granule, as described in U.S. Pat. No. 6,544,313, entitled "Sulfur-containing fertilizer composition and method for preparing same," incorporated herein by reference in its entirety. The platelets provide a large surface area, thereby increasing the exposure of the sulfur for oxidation. With these granules, it has been shown that the oxidation rate of elemental sulfur depends on the surface area in contact with the soil after collapse of the granule when soluble compounds diffuse away. As a result, the relative oxidation rate increases with decreasing granule size, and with decreasing percent elemental sulfur in the fertilizer granule.

However, the rate of elemental sulfur oxidation from these granules is still slower than for elemental sulfur dispersed through soil. As illustrated in FIG. 1, the soluble components SOL, such as mono or di-ammonium phosphate (MAP or DAP), triple superphosphate, or urea, of the granule diffuse away, and the insoluble materials including elemental sulfur ES are left in the collapsed granule cavity. This can trap otherwise usable elemental sulfur particles which remain unavailable for oxidation, and therefore unusable to the plant. There remains a need to increase the surface area of elemental sulfur in fertilizer granules to maximize the sulfur available for oxidation within the granule residue.

SUMMARY

Embodiments of the invention are directed to fertilizer granules containing elemental sulfur which expand or swell in contact with soil moisture to more readily disperse the elemental sulfur within the soil matrix, which increases the available elemental sulfur surface area for oxidation, and ultimately uptake of sulfur by the plant.

In a first embodiment, elemental sulfur is blended with one or more hydrogel materials and applied as a coating to an outer surface of the base fertilizer granule. For the purpose of this application, hydrogels are polymeric networks capable of absorbing or imbibing large amounts of water. Furthermore, the hydrogel is biodegradable, nontoxic to plants, soils, microorganisms, and humans. Suitable hydrogels can include, for example, gums, polysaccharides, and/or polymers. When the hydrogel/elemental sulfur coated granule is introduced to the soil, the hydrogel swells, resulting in dispersion of the particles or platelets of elemental sulfur away from the base granule and into the soil, thus making it more available for oxidation.

In an alternative embodiment, elemental sulfur particles are blended with the hydrogel material and added or homogenized with a base fertilizer composition. The homogenized fertilizer composition is then granulated such that the hydrogel with elemental sulfur particles are co-granulated with and throughout the base fertilizer composition. The co-granulation can also be achieved by introducing the ES and hydrogel homogeneously into a base fertilizer granulation, prilling or compaction circuit.

In embodiments, the base fertilizer composition can comprise any of a variety of suitable NPK fertilizers, including, for example, a nitrogen based fertilizer (e.g. urea), a potassium based fertilizer (e.g. potash or muriate of potash (MOP)), or a phosphate based fertilizer (e.g. mono or di-ammonium phosphate (MAP or DAP), triple superphosphate (TSP)), or combinations thereof. The base fertilizer composition can optionally contain or be co-granulated with one or more sources of micronutrients and/or secondary nutrients, such as, micronutrients including boron (B), zinc (Zn), manganese (Mn), molybdenum (Mo), nickel (Ni), copper (Cu), iron (Fe), and/or chlorine (Cl), and/or secondary nutrients including an additional source of sulfur (S) in its elemental form, sulfur in its oxidized sulfate form ($SO_4$), magnesium (Mg), and/or calcium (Ca), or any of a variety of combinations thereof at various concentrations.

The above summary of the invention is not intended to describe each illustrated embodiment or every implementation of the present invention. The detailed description that follows more particularly exemplifies these embodiments.

BRIEF DESCRIPTION

FIGS. 4A-4E depict dissolution in water of single granules with various formulations according to embodiments.

FIG. 5 depicts the dispersion in moist soil of sulfur-expandable fertilizer granules with various formulations according to the embodiments.

Figure 1:
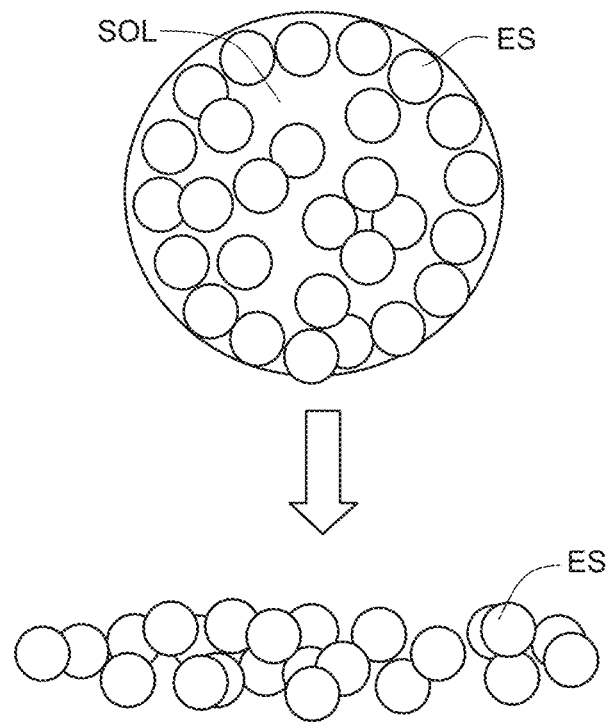
FIG. 1 depicts a sulfur-containing fertilizer granule according to the prior art.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Embodiments of the invention are directed to fertilizer granules containing elemental sulfur which expand in the soil to increase the elemental sulfur surface area exposed to soil, thereby increasing the availability of the elemental sulfur for oxidation, and ultimately uptake by the plant. The fertilizer granules contain an expandable material, such as a hydrogel, which draws in moisture and swells when exposed to moist soil, pushing the elemental sulfur particles or platelets away from the granule residue and out into the soil, thereby increasing their available surface area exposed to microorganisms. By the incorporation of materials, and particularly hydrogels, oxidation rates can be tuned or tailored for different crops to speed up oxidation in climates where oxidation of elemental sulfur is too slow to meet early sulfur requirements of the crops.

Figure 2:
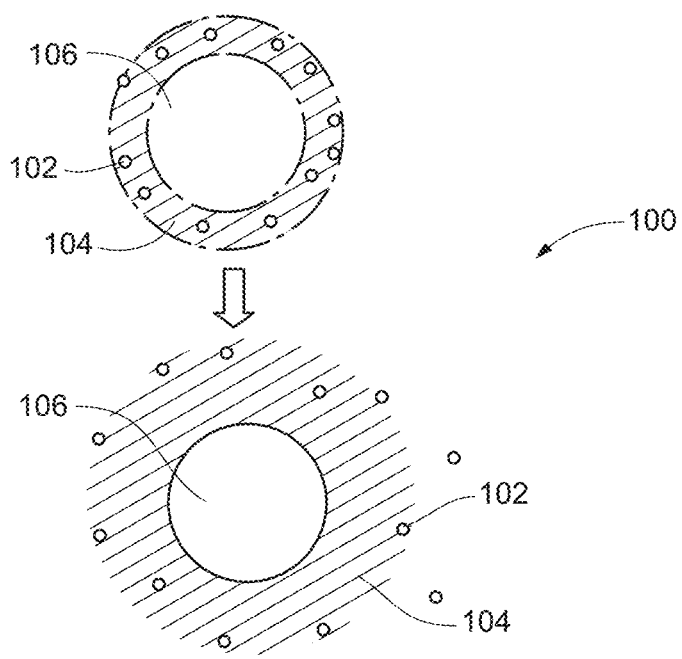
FIG. 2 depicts an expandable sulfur-containing fertilizer granule according to an embodiment in which the hydrogel and ES are coated on the granule.

In a first embodiment, and referring to FIG. 2, an expandable sulfur containing granule 100 includes particles or platelets of elemental sulfur 102 dispersed within or blended with a hydrogel material 104 to form a coating material. The coating material can optionally contain a clay material, such as sodium bentonite, to further aid in absorbing or imbibing water. The coating material is then applied, such as, but not limited to, in the form of a dry powder coating, with or without a liquid binder, to an outer surface of a base fertilizer granule 106 in one or more layers. The hydrogel material is soluble or biodegradable when applied to the soil such that, upon introduction to the soil, the hydrogel disperses away from the granule, leaving individual particles or platelets of elemental sulfur in the soil available for oxidation.

In this embodiment, base fertilizer granule 106 can comprise any of a variety of suitable NPK fertilizers, including, for example, a nitrogen based fertilizer (e.g. urea), a potassium based fertilizer (e.g. potash or muriate of potash (MOP)), or a phosphate based fertilizer (e.g. MAP, DAP, and/or TSP), or combinations thereof. The base fertilizer granule 106 can optionally contain one or more sources of micronutrients and/or secondary nutrients, such as, but not limited to, micronutrients including boron (B), zinc (Zn), manganese (Mn), molybdenum (Mo), nickel (Ni), copper (Cu), iron (Fe), and/or chlorine (Cl), and/or secondary nutrients including an additional source of sulfur (S) in its elemental form, sulfur in its oxidized sulfate form ($SO_4$), magnesium (Mg), and/or calcium (Ca), or any of a variety of combinations thereof at various concentrations.

Hydrogel material 104 can comprise any of a variety of liquid or dry hydrogel materials which expand with force and which have the potential to expand within the confines of the soil, and can include, for example, gelatinous materials, gums, and/or polysaccharides. Hydrogel materials 104 can comprise, for example, a material that provides one or more of the polymeric network described in Table 1 below:

TABLE 1

Hydrogel materials

| Material | Description |
| --- | --- |
| Sodium bentonite | Clay, $[(Si\ Al)_4(AlFeMg)_2O_{10}(OH)_2]_2 \cdot Na \cdot H_2O$ |
| Corn starch | Carbohydrate, $C_{27}H_{48}O_{20}$ |
| Calcium alginate | Edible gelling agent, $(C_{12}H_{14}CaO_{12})_n$ |
| Rice starch | Polysaccharide, $(C_6H_{10}O_5)_n$ |
| Inulin | Fructose polymers from plants |
| Sodium polyacrylate | Sodium salt of poly acrylic acid, $[-CH_2-CH(CO_2Na)-]n$ |
| Carrageenan gum | Polysaccharides ex red seaweed (1,3-α-1,4-β galactans) |
| Psyllium husk | Edible fibrous husk from Pantago Ovata plant |
| Gum Arabic | Glycoproteins and polysaccharides from Acacia |
| Chitosan | Linear polysaccharide from NaOH on shrimp shells |
| Xanthan gum | Bacterial polysaccharide, $(C_{35}H_{49}O_{29})_n$ |
| Carboxymethyl cellulose (CMC) | Sodium salt of cellulose with ($-CH_2-COOH$)groups |
| Guar gum | Galactose and mannose polysaccharides ex Guar beans |
| Barley husk | Hemicellulose with (~4% wt) glucuronic acid |
| Carob-locust bean gum | Galactose and mannose polysaccharides ex carob seeds |

In embodiments, elemental sulfur particles 102 are present to obtain total elemental sulfur in an amount of from about 0.1 weight percent to about 20 weight percent, more specifically from about 1 weight percent to about 10 weight percent, and more particularly no more than about 5-6 weight percent. Hydrogel material 104 is present in an amount of from about 0.1 weight percent to about 20 weight percent, more specifically from about 1 weight percent to about 10 weight percent, and more particularly no more than about 5-6 weight percent.

Figure 3:
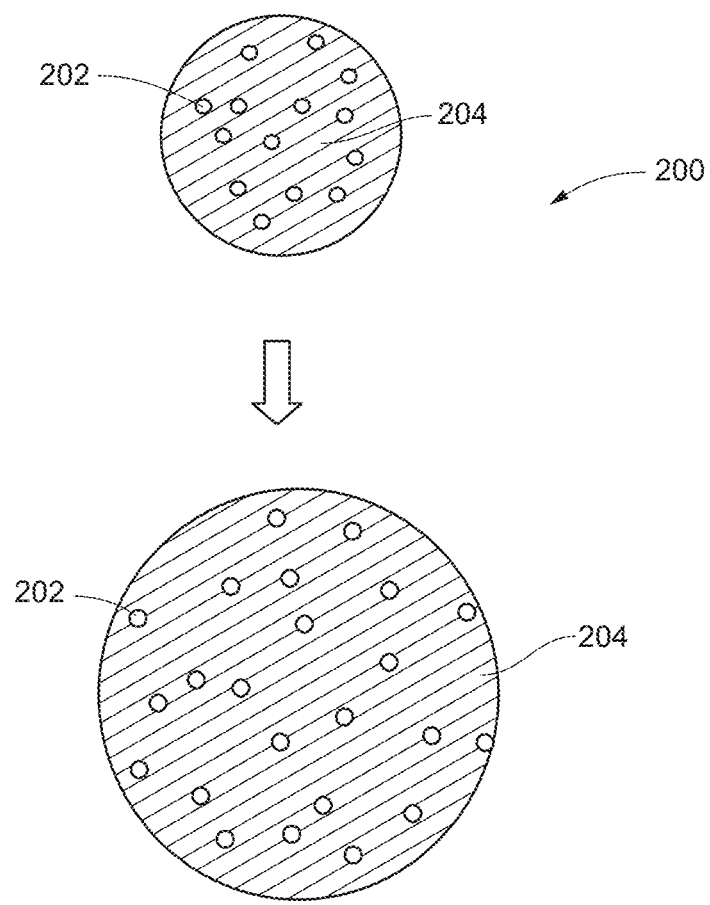
FIG. 3 depicts an expandable sulfur-containing fertilizer granule according to another embodiment in which the hydrogel an ES are cogranulated with the granule.

In an alternative embodiment, and referring to FIG. 3, an expandable sulfur containing granule 200 contains co-granulated elemental sulfur particles or platelets 202 and hydrogel material 204. More specifically, individual particles or platelets of elemental sulfur 202 are blended with a hydrogel material 204, and optionally sodium bentonite, which are then co-granulated with an underlying base fertilizer composition to form the granules 200.

In this embodiment, the base fertilizer composition can comprise any of a variety of suitable NPK fertilizers, including, for example, a nitrogen based fertilizer (e.g. urea), a potassium based fertilizer (e.g. potash or MOP), or a phosphate based fertilizer (MAP, DAP, and/or TSP), or combinations thereof. The base fertilizer granule can optionally contain or be co-granulated with one or more sources of micronutrients micronutrients, such as boron (B), zinc (Zn), manganese (Mn), molybdenum (Mo), nickel (Ni), copper (Cu), iron (Fe), and/or chlorine (Cl), and/or secondary nutrients including an additional source of sulfur (S) in its elemental form, sulfur in its oxidized sulfate form ($SO_4$), magnesium (Mg), and/or calcium (Ca), or any of a variety of combinations thereof at various concentrations.

Hydrogel material 204 can comprise any of a variety of hydrogel materials which expand with force, and have the potential to expand within the confines of the soil, including those described in Table 1 above.

In embodiments, elemental sulfur particles 202 are present to obtain total elemental sulfur in an amount of from about 0.1 weight percent to about 20 weight percent, more specifically from about 1 weight percent to about 10 weight percent, and more particularly no more than about 5-6 weight percent. Hydrogel material 204 is present in an amount of from about 0.1 weight percent to about 20 weight percent, more specifically from about 1 weight percent to about 10 weight percent, and more particularly no more than about 5-6 weight percent.

Examples and Testing

Both coated and co-granulated MAP granules were formed and evaluated for their dispersion in both water and soil.

Preparation

The coated granules were prepared by the following method: MAP granules having a particle size in a range of about 2.36-3.35 mm were pipetted with water and rolled for about 20 seconds. Elemental sulfur particles having a particle size in a range of about 20-65 μm blended with a hydrogel material having a particle size of about 0.15 μm and sodium bentonite were added to the wetted MAP such that the elemental sulfur, hydrogel material, and sodium bentonite were each present in an amount of about 5 weight percent of the composition.

The co-granulated granules were prepared by milling MAP to sizes below 250 μm. Elemental sulfur particles having a particle size in a range of about 20-65 μm blended with a hydrogel material having a particle size of about 0.15 μm and sodium bentonite were added to the MAP and homogenized, such that the elemental sulfur, hydrogel material, and sodium bentonite were each present in an amount of about 5 weight percent of the composition. Water was added via a nebulizer to the powder to build granules. Undersized granules (i.e. <1 mm) were recycled to the granulation circuit until granules having a particle size in a range of about 1-2.8 mm were produced.

Another series of coated and co-granulated granules were made in the same way but without any addition of sodium bentonite.

Testing—Dispersion in Water

Figure 4C:
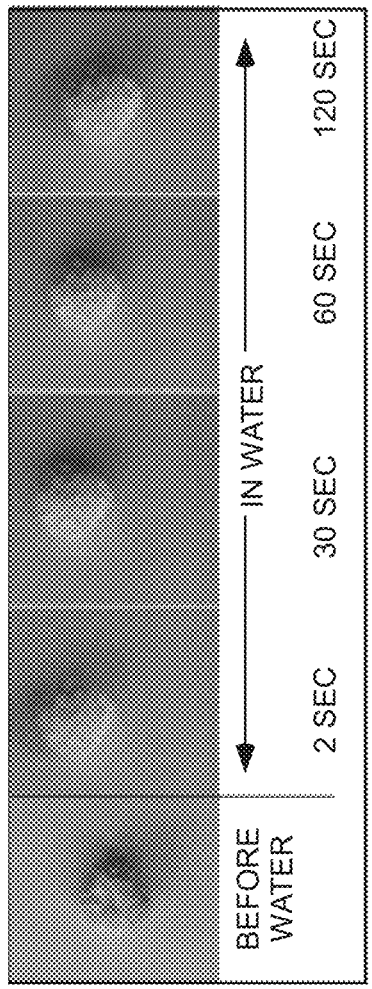

Dispersion in water of the granules was tested by imaging, at various intervals, a single granule's dissolution in tap water over 60 or 120 seconds in Petri dishes. The following granules were tested, as control samples depicted in FIG. 4A-C namely Microessentials® with zinc (MESZ), which had 5% elemental sulfur incorporated, MAP, and MAP with 5% elemental sulfur coated on its surface. These control samples contained no hydrogel and/or bentonite coating or co-granulation. All showed very little dispersion in water over 60 or 120 seconds.

Figure 4D:
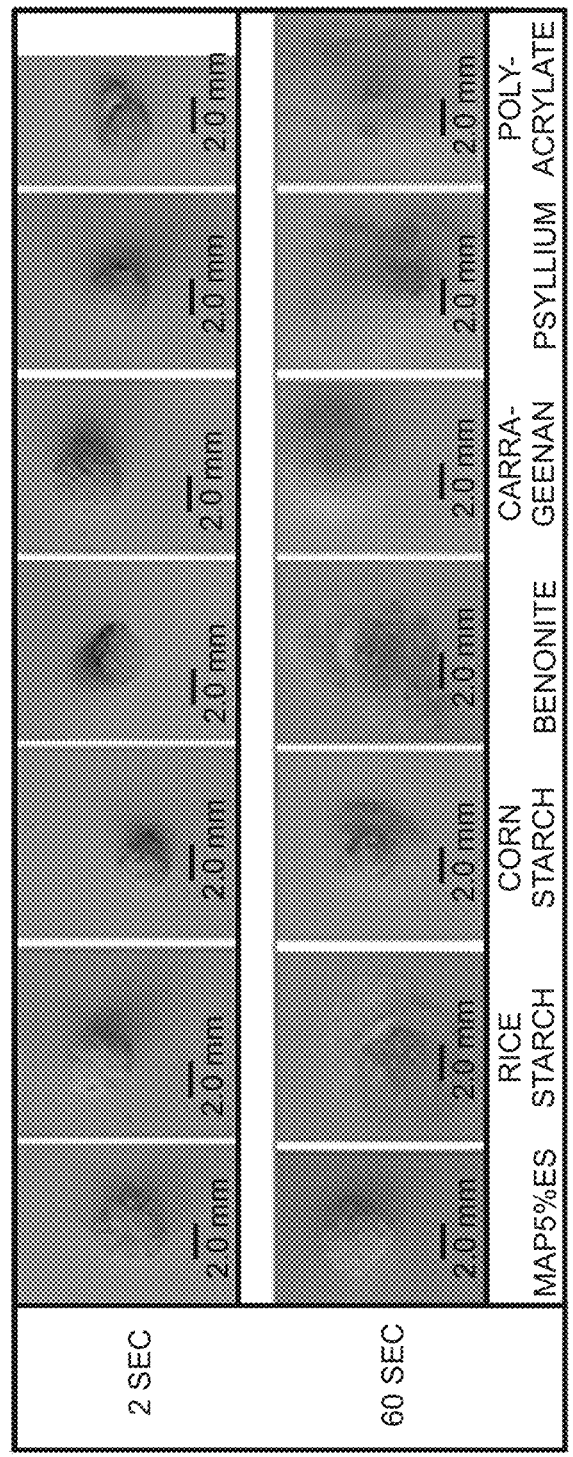
Figure 6:
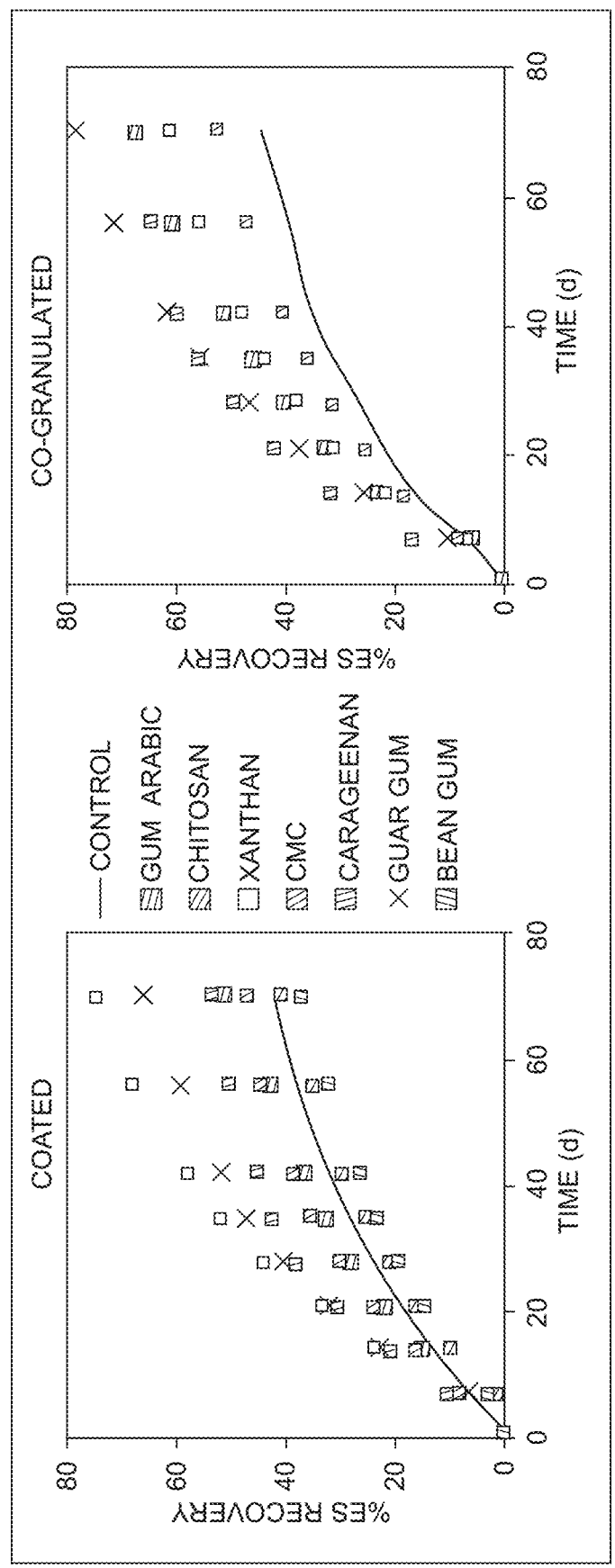
FIG. 6 depicts column oxidation of elemental sulfur in fertilizer according to the embodiments.

FIG. 4D shows a coating dispersion comparison between the MAP coated with 5% ES without hydrogel or bentonite (control) compared with MAP coated with 5% ES plus 5% hydrogel and 5% bentonite in the coating. The hydrogels tested included rice starch, corn starch, bentonite, to now include 10%, carrageenan, psyllium husk, and polyacrylate. The dispersion is much more pronounced with these hydrogel coatings as seen in the images.

FIG. 4E shows differences in the dispersion in water of MAP granules with hydrogel, in this case carrageenan/bentonite, either in the coating or granulated uniformly throughout the granule, the wider dispersion for the co-granulated granule being clearly evidenced in these images.

FIG. 5 shows stereomicroscope images using a Nikon SMZ25 with CCD camera of MAP with 5% ES and 5% hydrogel (no bentonite) both coated or co-granulated and incubated in moist soil for 16 and 220 hours. These show granule swelling in soil and reinforce the need for a hydrogel with swelling force.

Testing—Column Oxidation

The oxidation of elemental sulfur in soil for the various compositions, both coated and cogranulated with elemental sulfur and hydrogel (but without any addition of bentonite), was measured over 72 days using a column oxidation technique. To do this, 50 g of a sandy soil (pH(water) 8.5, 0.7% OC) was placed in a vertical column with 240 mg of fertilizer (for a total elemental sulfur weight percent of about 12 mg) mixed through the soil.

Each column was leached immediately with de-mineralized water to remove sulfur in the form of sulfate. The columns were then incubated at 25° C. The columns were leached weekly and the leachate was analyzed for sulfate content to measure the amount of elemental sulfur converted to sulfate over the course of the week. Each treatment was carried out with four replicates. The results are shown in FIG. 6. Table 2 gives the amount of ES oxidized recovered in the leachate at the end of the experiment:

TABLE 2

% ES oxidized for coated and uncoated MAP 5% ES with hydrogels in a soil column study after 72 days. Different letters indicate significant ($P \leq 0.05$) differences within the column.

| Hydrogel | Coated | | Co-granules | |
|---|---|---|---|---|
| | % ES oxidized/72 d | | | |
| Xanthan gum | 74.8 | a | 61.0 | bc |
| Guar gum | 66.2 | ab | 78.8 | A |
| Carrageenan | 52.9 | bc | 67.3 | ab |
| Gum arabic | 51.2 | c | 67.3 | ab |
| CMC | 47.9 | c | 52.6 | cd |
| Chitosan | 41.2 | c | | n/a |
| Bean gum | 37.4 | c | | n/a |
| Control | 42.5 | c | 44.2 | D |

The results of both the water dispersion and column oxidation tests showed that although most of the hydrogel materials promoted dispersion of the granules in water, only some of these hydrogels, particularly xanthan gum, guar gum, and carrageenan, promoted the oxidation of elemental sulfur in soil, possibly because the force from the hydrogel itself must be greater than the counteracting force from the soil on the granule in order to promote dispersion of the sulfur particles within the soil.

The invention may be embodied in other specific forms without departing from the essential attributes thereof; therefore, the illustrated embodiments should be considered in all respects as illustrative and not restrictive.

What is claimed is:

1. A fertilizer product containing swellable sulfur-containing granules, each granule comprising:

a base fertilizer composition;

a source of elemental sulfur in an amount from about 0.1 to about 20 weight percent of the granule; and a hydrogel, wherein the source of elemental sulfur and the hydrogel are co-granulated with the base fertilizer composition, and wherein the granules are configured to expand upon introduction to a soil environment to increase a surface area of the elemental sulfur exposed to the soil environment.

2. The product of claim 1, wherein the hydrogel is present in an amount of from about 0.1 weight percent to about 20 weight percent of the granule.

3. The product of claim 2, wherein the hydrogel is present in an amount of from about 1 weight percent to about 10 weight percent of the granule.

4. The product of claim 3, wherein the hydrogel is present in an amount of about 5 weight percent of the granule.

5. The product of claim 1, wherein the elemental sulfur is present in an amount of from about 1 weight percent to about 10 weight percent of the granule.

6. The product of claim 5, wherein the elemental sulfur is present in an amount of about 5 weight percent of the granule.

7. The product of claim 1, wherein the base fertilizer composition is selected from the group consisting of MAP, DAP, triple super phosphate, urea, MOP, and combinations thereof.

8. The product of claim 7, wherein the base fertilizer composition comprises MAP.

9. The product of claim 1, wherein a rate of oxidation of the elemental sulfur of the granule is greater than a rate of oxidation of elemental sulfur contained with a granule without hydrogel.

10. The product of claim 1, wherein the hydrogel is selected from the group consisting of bentonite or other water-absorbent clays, psyllium husk, corn starch, carrageenan gum, rice starch, sodium polyacrylate, glucose, calcium alginate, inulin, chitosan, carboxymethycellulose, fumed silica, guar gum, Xanthan gum, bean gum, gum arabic, and combinations thereof.

11. The product of claim 1, wherein the base fertilizer composition comprises a primary nutrient, and nutrients selected from the group consisting of boron (B), zinc (Zn), manganese (Mn), molybdenum (Mo), nickel (Ni), copper (Cu), iron (Fe), chlorine (Cl), sulfur in its oxidized sulfate form ($SO_4$), magnesium (Mg), calcium (Ca), and combinations thereof.

* * * * *